United States Patent Office 3,745,181
Patented July 10, 1973

3,745,181
PROCESS FOR THE PREPARATION
OF SURFACTANTS
Arthur N. Wrigley, Glenside, Raymond G. Bistline, Jr., Philadelphia, Edward S. Rothman, North Hills, Samuel Serota, Philadelphia, and Alexander J. Stirton, deceased, by Margaret H. Stirton, executrix, Philadelphia, Pa., assignors to the United States of America as represented by the Secretary of Agriculture
No Drawing. Filed June 28, 1971, Ser. No. 157,761
Int. Cl. C07c 143/12, 143/52
U.S. Cl. 260—400                                  17 Claims

ABSTRACT OF THE DISCLOSURE

The 2-sulfoethyl esters and N-methyl-N-(2-sulfoethyl) amides of a number of fatty acids such as pelargonic, lauric, myristic, palmitic, stearic, oleic, phenylstearic, and tallow fatty acids were prepared by acylation of sodium isethionate and N-methyltaurine, respectively with the corresponding isopropenyl fatty ester. Products of high purity were obtained in good yield in reaction times of 10 to 90 minutes and at a temperature from 125° C. to 200° C. The products are known to be good surfactants.

---

A non-exclusive, irrevocable, royalty-free license in the invention herein described, throughout the world for all purposes of the United States Government, with the power to grant sub-licenses for such purposes, is hereby granted to the Government of the United States of America.

This invention relates to the preparation of surfactants and especially to a simple, short reaction time process for producing surfactants of high purity in good yield. More particularly, it relates to the isopropenyl fatty acid ester acylation of sodium isethionate and N-methyltaurine to produce 2-sulfoethyl ester and N-methyl-N-(2-sulfoethyl) amide surfactants in high yield and purity and free of inorganic salts.

Although the products made by this invention are not new, the many methods by which they have been made previously have been very expensive and not entirely satisfactory in yield and purity. Consequently, these compounds, which are known to be good detergents and lime soap dispersing agents, have not captured any appreciable share of the household detergent market.

An object of this invention is to provide a new method of preparing well known surfactants.

Another object of this invention is to provide a process feasible for preparing surfactants in high yield and purity.

In general, according to this invention sodium isethionate and N-methyltaurine were acylated with the isopropenyl esters of a number of fatty acids to prepare the corresponding 2-sulfoethyl esters and N-methyl-N-(2-sulfoethyl) amides. The reactions were generally run at temperatures between 125° and 200° C. and in the presence of a catalyst such as p-toluenesulfonic acid.

The isopropenyl esters are readily synthesized by the addition of propyne to carboxylic acids under pressure using a zinc fatty acid salt as catalyst as described in the pending application, Ser. No. 822,693, filed Feb. 5, 1969, now Pat. No. 3,644,395 by two of the applicants of the present invention. Examples of natural and synthetic fatty acids and oils from which the isopropenyl esters may be made are as follows: caprylic, capric, pelargonic, lauric, myristic, palmitic, stearic, oleic, linoleic, linolenic, lauronolic, and cycloalkane or heptane carboxylic, o- or m-toluic, cumic, phenylacetic, phenylstearic, etc., tall oil acid, hydrogenated tall acids, hydrogenated tallow acids, naphthenic acids, abietic acids, and the like, alkyl benzoic acids such as dodecylbenzoic acid, nonylbenzoic acid, octylbenzoic acid, acid mixtures from various natural plant and animal oils such as: olive, tallow, castor, peanut, coconut, soybean, cottonseed, linseed; fish oils such as: cod, herring, menhaden, etc., neat's foot, sperm, palm, corn, butter, babassu, kapok, hempseed mustard, rubberseed, rape, safflower and sesame.

Commercially available pelargonic, lauric, myristic, palmitic, stearic and oleic acids were purified to 96% purity before making the corresponding isopropenyl esters. Phenylstearic acid was used as purchased. The hydrogenated tallow fatty acids had the following composition: stearic, 64.6%; oleic, 1.3%; palmitic, 29.7%; myristic, 4.0%; and lauric, 0.2%.

The process of the present invention offers many advantages. It provides high yields in short reaction times with acetone as the only by-product; the 2-sulfoethyl esters and N-methyl-N-(2-sulfoethyl) amides are obtained free of inorganic salts; and the process is simple and uncomplicated. In addition, both anionic and nonionic detergents can be made. Anionic detergents can be made by reacting the isopropenyl fatty esters with sodium isethionate, taurine, methyltaurine, glycine, alamine and protein hydrolyzate. Nonionic detergents can be made by reacting isopropenyl fatty esters with di-(2-hydroxyethyl) amine (diethanolamine), hydroxyethylamine, ethylene glycol, polyethylene glycol, glycerol pentaerythritol, mannitol, sorbitol and other hexitols.

Another advantage of the process of the present invention is the fact that the isopropenyl fatty esters melt at temperatures below 40° C. and consequently they tend to serve as solvent in the reaction as well as reagent.

Preparation of the 2-sulfoethyl esters and the N-methyl-N-(2-sulfoethyl) amides is exemplified in the following examples:

Example 1.—Sodium 2-sulfoethyl stearate

A mixture of 0.075 mole isopropenyl stearate, 0.093 mole sodium isethionate and 0.001 mole p-toluenesulfonic acid was heated at 200° C. in a Wood's metal bath for 30 minutes. Most of the product formed within the first 10 minutes. Acetone vapor, the only by-product, began to form within the first minute. Unreacted isopropenyl stearate was acetone-extracted from the cooled reaction product. The 2-sulfoethyl ester, which contained sodium isethionate was obtained in 95% crude yield, and was subsequently crystallized three times from 50% ethanol to produce a white crystalline product in 78% yield.

Analysis.—Calculated for $C_{20}H_{39}SO_5Na$ (percent): C, 57.94; H, 9.48; S, 7.73; Na, 5.55. Found (percent): C, 57.74; H, 9.50; S, 7.74; Na, 5.47.

Example 2.—Sodium N-methyl-N(2-sulfoethyl) stearamide

A mixture of 0.075 mole isopropenyl stearate, 0.092 mole N-methyltaurine sodium salt and 0.001 mole p-toluenesulfonic acid was reacted at 200° C. for 90 minutes producing a 95% crude yield of sodium N-methyl-N-(2-sulfoethyl) stearamide and N-methyltaurine. Acetone appeared 17 minutes after the reaction flask was immersed in the bath. The product was crystallized three times from 50% ethanol to produce a white crystalline material in 70% yield.

*Analysis.*—Calculated for $C_{21}H_{42}NSO_4Na$ (percent): C, 58.98; H, 9.90; N, 3.28; S, 7.50; Na, 5.38. Found (percent): C, 58.66; H, 10.06; N, 3.06; S, 7.66; Na, 5.40.

Example 3.—Sodium 2-sulfoethyl stearate

A mixture of 0.077 mole isopropenyl stearate, 0.088 mole sodium isethionate and 0.001 mole p-toluenesulfonic acid was reacted for 30 minutes at 150° C. Upon cooling the the product was acetone-extracted to remove unreacted isopropenyl stearate yielding sodium 2 sulfoethyl stearate in 62.5% yield.

Example 4.—Sodium 2-sulfoethyl stearate

A mixture of 0.077 mole isopropenyl stearate, 0.092 mole sodium isethionate and 0.001 mole p-toluenesulfonic acid was reacted at 200° C. for 10 minutes. The product was isolated in 88.7% yield.

Example 5.—Sodium 2-sulfoethyl stearate

Example 4 was repeated, extending the reaction time to 20 minutes. Product was isolated in 90.5% yield.

Example 6.—Sodium 2-sulfoethyl stearate

Example 4 was repeated, extending the reaction time to 30 minutes. Product was obtained in 95.2% yield.

Example 7.—Sodium N-methyl-N(2-sulfoethyl) stearamide

A mixture of 0.077 mole isopropenyl stearate, 0.087 mole N-methyltaurine sodium salt and 0.001 mole p-toluenesulfonic acid was reacted for 20 minutes at 185° C. The product was obtained in 45% yield.

Example 8.—Sodium N-methyl-N(2-sulfoethyl) stearamide

A mixture of 0.077 mole isopropenylstearate, 0.092 mole N-methyltaurine sodium salt and 0.001 mole p-toluene sulfonic acid was reacted at 200° C. for 45 minutes. N-methyl N-stearoyltauride, sodium salt was obtained in 88% yield.

Example 9.—Sodium N-methyl-N(2-sulfoethyl) stearamide

Example 8 was repeated, extending reaction time to 1 hour. A 93.5% yield was obtained.

Example 10.—Sodium N-methyl-N(2-sulfoethyl) stearamide

Example 8 was repeated extending the reaction time to 90 minutes. 95.5% yield of product was obtained.

In Examples 11 through 24, shown in Table I, the starting materials were reacted at about 200° C. for about 45 minutes.

As seen in the examples the process of this invention provides the advantages of obtaining high yields in short reaction time with acetone as the only by-product. With isopropenyl stearate, for example, heating at 200° C. for 10, 20 and 30 minutes afforded crude yields of the 2-sulfoethyl ester of 89, 91 and 95%, respectively. In the preparation of sodium N-methyl-N-(2-sulfoethyl) stearamide, reaction times of 45, 60 and 90 minutes resulted in 88, 94 and 95% crude yields. The 2-sulfoethyl esters and the N-methyl-N-(2-sulfoethyl) amides were obtained as white powders and free of inorganic salts.

TABLE I

| Example number | Isopropenyl ester, mole | Sodium isethionate, mole¹ | N-methyl-taurine sodium salt, mole¹ | Product | Percent yield |
|---|---|---|---|---|---|
| 11 | Pelargonate, 0.127 | 0.138 | | Sodium 2-sulfoethyl pelargonate | 83 |
| 12 | Pelargonate, 0.136 | | 0.156 | N-methyl N-pelargonyl tauride, Na salt | 70 |
| 13 | Laurate, 0.105 | 0.113 | | Sodium 2-sulfoethyl laurate | 77 |
| 14 | do | | 0.115 | N-methyl, N-lauroyltauride, sodium salt | 66 |
| 15 | Myristate, 0.101 | 0.111 | | Sodium 2-sulfoethyl myristate | 85.5 |
| 16 | Myristate, 0.093 | | 0.103 | N-methyl, N-myristoyltaurice sodium salt | 62.0 |
| 17 | Palmitate, 0.090 | 0.105 | | Sodium 2-sulfoethyl palmitate | 75 |
| 18 | Palmitate, .087 | | 0.097 | N-Methyl, N-palmitoyl tauride sodium salt | 97.5 |
| 19 | Oleate, 0.080 | 0.097 | | Sodium 2-sulfoethyl oleate | 66 |
| 20 | Oleate, .080 | | 0.092 | N-Methyl, N-oleoyltauride sodium salt | 67 |
| 21 | Phenylstearate, 0.073 | 0.083 | | Sodium 2-sulfoethyl phenyl stearate | 43 |
| 22 | Phenylstearate, 0.074 | | 0.084 | N-Methyl, N-phenylstearoyl sodium salt | 30 |
| 23 | Tallowate, 0.088 | 0.10 | | Sodium 2-sulfoethyl tallowate | 72 |
| 24 | Tallowate, 0.096 | | 0.106 | N-Methyl N-tallowoyl tauride sodium salt | 54 |

¹ In each example 0.001 mole of p-toluenesulfonic acid was added to the starting materials.

We claim:

1. A process for the preparation of surfactants comprising reacting an isopropenyl fatty ester with a compound selected from the group consisting of sodium isethionate and N-methyltaurine in the presence of a catalyst.

2. The process of claim 1 wherein the reaction is conducted at a temperature of about from 125° C. to 200° C. for about from 10 to 90 minutes.

3. A process for the preparation of surfactants comprising reacting an isopropenyl ester selected from the group consisting of isopropenyl pelargonate, isopropenyl laurate, isopropenyl myristate, isopropenyl palmitate, isopropenyl oleate, isopropenyl stearate, isopropenyl phenylstearate and isopropenyl tallowate with a compound selected from the group consisting of sodium isethionate and N-methyltaurine in the presence of p-toluenesulfonic acid at a temperature of about from 125° C. to 200° C. for about from 10 to 90 minutes.

4. The process of claim 3 in which the compound is sodium isethionate.

5. The process of claim 4 in which the isopropenyl ester is isopropenyl laurate.

6. The process of claim 4 in which the isopropenyl ester is isopropenyl palmitate.

7. The process of claim 4 in which the isopropenyl ester is isopropenyl stearate.

8. The process of claim 4 in which the isopropenyl ester is isopropenyl oleate.

9. The process of claim 4 in which the isopropenyl ester is isopropenyl phenylstearate.

10. The process of claim 3 in which the compound is N-methyltaurine.

11. The process of claim 10 in which the isopropenyl ester is isopropenyl laurate.

12. The process of claim 10 in which the isopropenyl ester is isopropenyl myristate.

13. The process of claim 10 in which the isopropenyl ester is isopropenyl stearate.

14. The process of claim 10 in which the isopropenyl ester is isopropenyl oleate.

15. The process of claim 10 in which the isopropenyl ester is isopropenyl phenylstearate.

16. A process for the preparation of sodium 2-sulfoethyl stearate comprising reacting at 200° C. for about from 10 to 30 minutes 0.075 mole of isopropenyl stearate with 0.093 mole of sodium isethionate in the presence of 0.001 mole of p-toluenesulfonic acid.

17. A process for the preparation of sodium N-methyl-N-(2-sulfoethyl) stearamide comprising reacting at 200° C. for about from 45 to 90 minutes 0.075 mole of isopropenyl stearate with 0.092 mole of N-methyltaurine sodium salt in the presence of 0.001 mole of p-toluenesulfonic acid.

References Cited

UNITED STATES PATENTS

| | | | |
|---|---|---|---|
| 2,999,871 | 9/1961 | Schenck | 260—400 |
| 3,151,136 | 9/1966 | Koczorowski et al. | 260—400 |
| 3,234,247 | 2/1966 | Abend et al. | 260—401 |

ELBERT L. ROBERTS, Primary Examiner

U.S. Cl. X.R.

260—401